(12) United States Patent
Choi et al.

(10) Patent No.: US 11,833,927 B2
(45) Date of Patent: Dec. 5, 2023

(54) THERMAL MANAGEMENT SYSTEM FOR FUEL CELL VEHICLE

(71) Applicant: HYUNDAI MOBIS CO., LTD., Seoul (KR)

(72) Inventors: Sung Kyung Choi, Yongin-si (KR); Jong Bo Won, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 526 days.

(21) Appl. No.: 17/116,592

(22) Filed: Dec. 9, 2020

(65) Prior Publication Data

US 2022/0161686 A1    May 26, 2022

(30) Foreign Application Priority Data

Nov. 20, 2020 (KR) .................. 10-2020-0156240

(51) Int. Cl.
  *H02K 9/19* (2006.01)
  *H02K 11/33* (2016.01)
  (Continued)

(52) U.S. Cl.
  CPC .............. *B60L 58/33* (2019.02); *B60L 50/71* (2019.02); *B60L 53/20* (2019.02);
  (Continued)

(58) Field of Classification Search
  CPC .......... B60L 58/33; B60L 53/20; B60L 50/71; B60L 2210/10; H02K 11/33; H02K 7/006;
  (Continued)

(56) References Cited

U.S. PATENT DOCUMENTS

| | | | |
|---|---|---|---|
| 8,151,917 B2 * | 4/2012 | Suzuki | B60K 6/365 165/42 |
| 9,242,560 B2 * | 1/2016 | Hashimoto | B60L 1/003 |

(Continued)

FOREIGN PATENT DOCUMENTS

| | | |
|---|---|---|
| EP | 1 251 022 A1 | 10/2002 |
| EP | 3 088 230 A1 | 11/2016 |

(Continued)

OTHER PUBLICATIONS

Korean Notice of Allowance dated Jun. 8, 2022, in counterpart Korean Patent Application No. 10-2020-0156240 (2 Pages in Korean).

(Continued)

*Primary Examiner* — John D Walters
(74) *Attorney, Agent, or Firm* — NSIP Law

(57) ABSTRACT

The present disclosure relates to a thermal management system for a fuel cell vehicle, the thermal management system including a cooling line configured to pass through power electronic parts of a vehicle and allow a coolant to circulate therethrough, a cooling unit provided in the cooling line and configured to cool the coolant, driving components provided in the cooling line and configured to drive the vehicle, and a bypass line having a first end connected to the cooling line at a first point positioned between the driving components and an outlet of the cooling unit, and a second end connected to the cooling line at a second point positioned between the driving components and an inlet of the cooling unit, such that it is possible to obtain an advantageous effect of improving cooling efficiency and cooling performance and improving safety and reliability.

16 Claims, 5 Drawing Sheets

(51) Int. Cl.
*H01M 8/04029* (2016.01)
*B60L 58/33* (2019.01)
*B60L 53/20* (2019.01)
*B60L 50/71* (2019.01)
*H02K 7/00* (2006.01)

(52) U.S. Cl.
CPC ........ *H01M 8/04029* (2013.01); *H02K 7/006* (2013.01); *H02K 9/19* (2013.01); *H02K 11/33* (2016.01); *B60L 2210/10* (2013.01); *H01M 2250/20* (2013.01)

(58) Field of Classification Search
CPC . H02K 9/19; H01M 8/04029; H01M 2250/20
See application file for complete search history.

(56) References Cited

U.S. PATENT DOCUMENTS

| | | | |
|---|---|---|---|
| 11,280,230 B2* | 3/2022 | Ahn | F01M 5/002 |
| 11,318,814 B2* | 5/2022 | Maeda | B60K 6/40 |
| 2002/0162693 A1* | 11/2002 | Mizuno | H01M 8/0612 |
| | | | 180/65.1 |
| 2009/0139686 A1 | 6/2009 | Suzuki | |
| 2013/0076126 A1 | 3/2013 | Hashimoto | |
| 2019/0323391 A1 | 10/2019 | Ahn et al. | |
| 2020/0398639 A1 | 12/2020 | Maeda | |

FOREIGN PATENT DOCUMENTS

| | | | |
|---|---|---|---|
| JP | 2002-280046 A | 9/2002 |
| JP | 2007-120312 A | 5/2007 |
| JP | 2008-094184 A | 4/2008 |
| JP | 5786594 B2 | 9/2015 |
| JP | 2017-212851 A | 11/2017 |
| JP | 2019-170027 A | 10/2019 |
| KR | 10-1610076 B1 | 4/2016 |
| KR | 10-1675675 B1 | 11/2016 |
| KR | 10-2019-0121450 A | 10/2019 |

OTHER PUBLICATIONS

Extended European Search Report dated May 31, 2021 in counterpart European Patent Application No. 20212855.9 (8 pages in English).

* cited by examiner

THERMAL MANAGEMENT SYSTEM FOR FUEL CELL VEHICLE

CROSS-REFERENCE TO RELATED APPLICATION

This application claims priority to and the benefit of Korean Patent Application No. 10-2020-0156240 filed in the Korean Intellectual Property Office on Nov. 20, 2020, the entire contents of which are incorporated herein by reference.

TECHNICAL FIELD

The present disclosure relates to a thermal management system for a fuel cell vehicle, and more particularly, to a thermal management system for a fuel cell vehicle, which is capable of improving cooling efficiency and cooling performance and improving safety and reliability.

BACKGROUND ART

A fuel cell vehicle (e.g., a hydrogen vehicle) is configured to autonomously generate electricity by means of a chemical reaction between fuel (hydrogen) and air (oxygen) and travel by operating a motor.

In general, the fuel cell vehicle includes a fuel cell stack configured to generate electricity by means of an oxidation-reduction reaction between hydrogen and oxygen ($O_2$), a fuel supply device configured to supply fuel (hydrogen) to the fuel cell stack, an air supply device configured to supply the fuel cell stack with air (oxygen) which is an oxidant required for an electrochemical reaction, and a thermal management system (TMS) configured to remove heat, which is generated from the fuel cell stack and power electronic parts of the vehicle, to the outside of the system and control temperatures of the fuel cell stack and the power electronic parts.

Meanwhile, recently, various attempts have been made to apply the fuel cell system to construction machines as well as passenger vehicles (or commercial vehicles).

The passenger vehicle is primarily intended to travel and has driving components (e.g., a motor) for driving the passenger vehicle. Because the driving components generate high-temperature heat while the passenger vehicle travels, it is important to cool the driving components.

In contrast, the construction machine is primarily intended to perform work (e.g., leveling work or loading work) in a stationary state (in a state in which the construction machine stops traveling), and thus it is important to cool power electronic parts that operate in the state in which the construction machine stops traveling.

As described above, the driving components of the passenger vehicle are primarily required to be cooled while the passenger vehicle travels, but the power electronic parts of the construction machine, which operate when the construction machine is stationary, are primarily required to be cooled. As a result, there is a problem in that it is difficult to apply the thermal management system, which is applied to the passenger vehicle, to the construction machine.

That is, in a case in which the thermal management system, which is applied to the passenger vehicle, is applied to the construction machine, the coolant is supplied to the driving components (e.g., the motor), which are not required to be cooled, even when the construction machine is stationary. As a result, there is a problem in that a flow of the coolant inevitably decreases (a flow rate decreases due to a pressure loss).

In addition, because the decrease in flow of the coolant causes a deterioration in cooling performance of the coolant, power consumption of a pump for circulating the coolant needs to be inevitably increased to ensure a sufficient flow of the coolant, and as a result, there is a deterioration in efficiency and performance in cooling the power electronic parts required to be cooled (i.e., the power electronic parts that generate high-temperature heat when the vehicle is stationary).

Therefore, recently, various types of research are conducted to effectively cool the power electronic parts that operate when the vehicle is stationary, but the research result is still insufficient. Accordingly, there is a need for development of a thermal management system capable of effectively cooling power electronic parts.

SUMMARY OF THE INVENTION

An object of the exemplary embodiment of the present disclosure is to provide a thermal management system for a fuel cell vehicle, which is capable of improving cooling efficiency and cooling performance and improving safety and reliability.

Another object of the exemplary embodiment of the present disclosure is to more effectively cool power electronic parts that generate high-temperature heat when a vehicle is stationary, and to improve operational performance and operational efficiency of the power electronic parts.

Still another object of the exemplary embodiment of the present disclosure is to ensure a flow of a coolant and reduce power consumption.

Yet another object of the exemplary embodiment of the present disclosure is to improve efficiency in cooling oil that circulates along an oil circulation line.

Still yet another object of the exemplary embodiment of the present disclosure is to simplify a structure and improve a degree of design freedom and spatial utilization.

The object to be achieved by the exemplary embodiment is not limited to the above-mentioned objects, but also includes objects or effects that may be recognized from the solutions or the exemplary embodiments described below.

An exemplary embodiment of the present disclosure provides a thermal management system for a fuel cell vehicle, the thermal management system including a cooling line configured to pass through power electronic parts of a vehicle and allow a coolant to circulate therethrough, a cooling unit provided in the cooling line and configured to cool the coolant, driving components provided in the cooling line and configured to drive the vehicle, and a bypass line having a first end connected to the cooling line at a first point positioned between the driving components and an outlet of the cooling unit, and a second end connected to the cooling line at a second point positioned between the driving components and an inlet of the cooling unit.

This is to improve cooling efficiency and cooling performance of the fuel cell vehicle and improve safety and reliability.

That is, in a case in which the coolant is supplied to the driving components (e.g., a motor), which are not required to be cooled, even when the vehicle is stationary, there is a problem in that a flow of the coolant inevitably decreases (a flow rate decreases due to a pressure loss). In addition, because the decrease in flow of the coolant causes a deterioration in cooling performance of the coolant, power consumption of a pump for circulating the coolant needs to be inevitably increased to ensure a sufficient flow of the coolant, and as a result, there is a deterioration in efficiency and performance in cooling the power electronic parts required to be cooled (i.e., the power electronic parts that generate high-temperature heat when the vehicle is stationary).

In contrast, according to the exemplary embodiment of the present disclosure, since the coolant circulating along the cooling line selectively passes through the driving components, it is possible to obtain an advantageous effect of improving cooling efficiency and cooling performance of the fuel cell vehicle and improving safety and reliability.

Above all, according to the exemplary embodiment of the present disclosure, the coolant passes through the driving components (cools the driving components) or does not pass through the driving components (bypasses the driving components along the bypass line without passing through the driving components) based on whether the vehicle travels (e.g., in the traveling state or the stationary state). As a result, it is possible to obtain an advantageous effect of ensuring a smooth flow of the coolant, minimizing consumption of power of the pump for circulating the coolant, and efficiency in cooling the power electronic parts required to be cooled (e.g., the power electronic parts that generate high-temperature heat when the vehicle is stationary).

This is based on the fact that the amount of heat generated by the driving components is minimized (e.g., the amount of generated heat decreases to the extent that the cooling is not required) when the vehicle is stationary even though the driving components generates heat while the vehicle travels. Since the coolant bypasses the driving components along the bypass line without passing through the driving components (the coolant circulates along the cooling line without passing through the driving components) when the vehicle is stationary, the circulation route of the coolant passing through the power electronic parts may be shortened, and the cooling effect of the coolant may be concentrated on the power electronic parts. As a result, it is possible to obtain an advantageous effect of improving safety and reliability and improving efficiency of the coolant cooling the power electronic parts.

According to the exemplary embodiment of the present disclosure, the thermal management system for a fuel cell vehicle may include a first valve provided in the cooling line, positioned at the first point, and connected to the first end of the bypass line, and the first valve may selectively switch a flow path of the coolant to the driving components or the bypass line.

For example, the first valve may switch the flow path of the coolant to the driving components when the vehicle travels, and the first valve may switch the flow path of the coolant to the bypass line when the vehicle is stationary.

According to the exemplary embodiment of the present disclosure, the thermal management system for a fuel cell vehicle may include a pump provided in the cooling line, disposed between the outlet of the cooling unit and the driving components, and configured to force the coolant to flow, and the first end of the bypass line may be connected to the cooling line and disposed between the pump and the driving components.

For reference, in the exemplary embodiment of the present disclosure, the driving components of the vehicle may be understood as components that drive the vehicle (i.e., components required to drive the vehicle).

The type and the number of driving components may be variously changed depending on required conditions and design specifications.

For example, the driving components may include a motor configured to provide driving power required to drive the vehicle. In addition, the driving components may include an inverter provided in the cooling line, disposed between the first point and the driving components, and configured to convert electric current to be applied to the motor.

The connection structure between the bypass line and the cooling line may be variously changed depending on required conditions and design specifications.

According to the exemplary embodiment of the present disclosure, the cooling line may include a first line configured to connect the outlet of the cooling unit and the pump, a second line configured to connect the pump and the driving components, a third line connected in parallel to the second line and configured to connect the driving components, and a fourth line configured to connect the driving components and the inlet of the cooling unit, the first end of the bypass line may be connected to the second line, and the second end of the bypass line may be connected to the fourth line.

According to the exemplary embodiment of the present disclosure, the thermal management system for a fuel cell vehicle may include a connection line having an inlet end connected to the second line, and an outlet end connected to the bypass line.

According to the exemplary embodiment of the present disclosure, the thermal management system for a fuel cell vehicle may include a second valve provided in the second line and connected to the inlet end of the connection line.

According to the exemplary embodiment of the present disclosure, the thermal management system for a fuel cell vehicle may include an oil circulation line provided in the vehicle and configured to allow oil to circulate therethrough, and a heat exchanger configured to allow the coolant and the oil to exchange heat.

In the exemplary embodiment of the present disclosure described above, the coolant circulating along the cooling line and the oil circulating along the oil circulation line exchange heat by means of the heat exchanger, and as a result, it is possible to obtain an advantageous effect of improving performance in cooling the oil.

Above all, according to the exemplary embodiment of the present disclosure, since the coolant and the oil exchange heat, a temperature of the oil may be lowered without increasing a capacity of an oil cooling unit (a cooling unit for cooling the oil circulating along the oil circulation line), and as a result, it is possible to obtain an advantageous effect of simplifying the structure and improving a degree of design freedom and spatial utilization.

In particular, according to the exemplary embodiment of the present disclosure, it is possible to additionally reduce a temperature of the oil even when a vehicle (e.g., a construction machine), which cannot use vehicle-induced wind, is stationary, and as a result, it is possible to obtain an advantageous effect of improving stability and reliability of components to which the oil is supplied.

According to the exemplary embodiment of the present disclosure, the thermal management system for a fuel cell vehicle may include an oil pump provided in the oil circulation line and configured to force the oil to flow, and an oil cooling unit provided in the oil circulation line and configured to cool the oil.

In particular, the thermal management system for a fuel cell vehicle may include a heat exchange line connected to the cooling line and disposed between the outlet of the cooling unit and the driving components, and the oil circulation line and the heat exchange line may be provided to pass through the heat exchanger.

As described above, since the heat exchanger is provided in the heat exchange line that branches off from the cooling line, the heat exchange between the oil and the coolant may be selectively performed based on whether the vehicle travels (e.g., whether the vehicle is in the traveling state or the stationary state).

More particularly, the thermal management system for a fuel cell vehicle may include a third valve provided in the cooling line and connected to one end of the heat exchange line.

According to the exemplary embodiment of the present disclosure, the third valve may selectively shut off a supply of the coolant to the heat exchange line based on a temperature of the oil.

According to the exemplary embodiment of the present disclosure, the third valve may selectively shut off the supply of the coolant to the heat exchange line based on a temperature of the coolant.

As described above, in the exemplary embodiment of the present disclosure, the third valve selectively shuts off the supply of the coolant to the heat exchange line based on a temperature of the coolant, and as a result, it is possible to obtain an advantageous effect of minimizing an influence of the heat exchange between the coolant and the oil (e.g., a deterioration in performance in cooling the power electronic parts and the driving components caused by an increase in temperature of the coolant).

DETAILED DESCRIPTION

Figure 1:
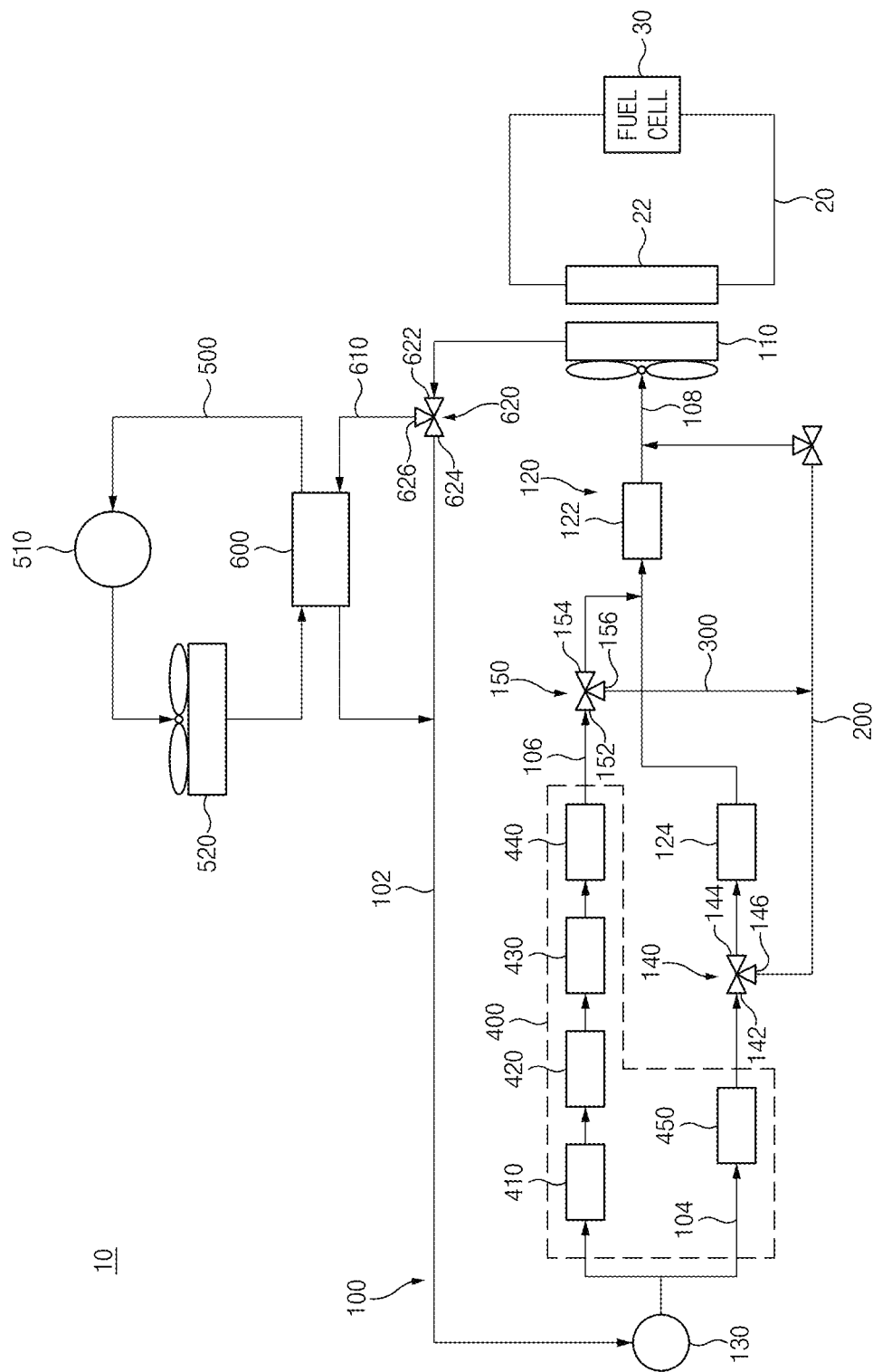
FIG. 1 is a view for explaining a thermal management system for a fuel cell vehicle according to an exemplary embodiment of the present disclosure.

Hereinafter, exemplary embodiments of the present disclosure will be described in detail with reference to the accompanying drawings.

However, the technical spirit of the present disclosure is not limited to some exemplary embodiments described herein but may be implemented in various different forms. One or more of the constituent elements in the exemplary embodiments may be selectively combined and substituted within the scope of the technical spirit of the present disclosure.

In addition, unless otherwise specifically and explicitly defined and stated, the terms (including technical and scientific terms) used in the exemplary embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the exemplary embodiment of the present disclosure are for explaining the exemplary embodiments, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the exemplary embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "up (above) or down (below)" may include a meaning of a downward direction as well as an upward direction based on one constituent element.

Referring to FIGS. 1 to 5, a thermal management system 10 for a fuel cell vehicle according to an exemplary embodiment of the present disclosure includes a cooling line 100 configured to pass through power electronic parts 400 of a vehicle and to allow a coolant to circulate therethrough, a cooling unit 110 provided in the cooling line 100 and configured to cool the coolant, driving components 120 provided in the cooling line 100 and configured to drive the vehicle, and a bypass line 200 having a first end connected to the cooling line 100 at a first point positioned between the driving components 120 and an outlet of the cooling unit 110, and a second end connected to the cooling line 100 at a second point positioned between the driving components 120 and an inlet of the cooling unit 110.

For reference, in the exemplary embodiment of the present disclosure, the cooling line 100, together with a fuel cell cooling line 20 passing through a fuel cell stack 30, may constitute a TMS line (not illustrated) in which the coolant (e.g., water) may flow while performing heat exchange. The coolant may be used as a cooling medium or a heating medium in the TMS line.

The fuel cell cooling line 20 is configured to pass through the fuel cell stack 30, and the coolant may circulate along the fuel cell cooling line 20.

The fuel cell cooling line 20 may define a cooling loop for cooling the coolant or a heating loop for heating (raising a temperature of) the coolant depending on a status of the vehicle. For example, the fuel cell cooling line 20 may define the heating loop to ensure a cold start ability in an initial start state and define the cooling loop to discharge heat generated in the fuel cell stack 30 to the outside while the vehicle travels.

A fuel cell cooling unit 22 (e.g., a radiator) may be provided in the fuel cell cooling line 20 to cool the coolant circulating along the fuel cell cooling line 20, and the fuel cell cooling unit 22 may be cooled by a cooling fan (not illustrated) that blows outside air.

In particular, the fuel cell cooling unit 22 and the cooling unit 110 in the cooling line 100 may be simultaneously cooled by the single cooling fan. As described above, since the fuel cell cooling unit 22 and the cooling unit 110 in the cooling line 100 are simultaneously cooled by the single cooling fan, it is possible to obtain an advantageous effect of simplifying a structure, improving a degree of design freedom and spatial utilization, and minimizing consumption of power required to cool the fuel cell cooling unit 22 and the cooling unit 110 in the cooling line 100.

For reference, the fuel cell stack 30 may have various structures capable of producing electricity by means of an oxidation-reduction reaction between fuel (e.g., hydrogen) and an oxidant (e.g., air).

For example, the fuel cell stack 30 includes: a membrane electrode assembly (MEA) (not illustrated) having catalyst electrode layers, in which electrochemical reactions occur, at both sides of an electrolyte membrane through which hydrogen ions move; a gas diffusion layer (GDL) (not illustrated) configured to uniformly distribute reactant gases and serve to transfer generated electrical energy; a gasket (not illustrated) and a fastener (not illustrated) configured to maintain leakproof sealability for the reactant gases and the coolant and maintain an appropriate fastening pressure; and a separator (bipolar plate) (not illustrated) configured to move the reactant gases and the coolant.

More specifically, in the fuel cell stack 30, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at both sides of the electrolyte membrane. Only the hydrogen ions are selectively delivered to the cathode through the electrolyte membrane, which is a positive ion exchange membrane, and at the same time, the electrons are delivered to the cathode through the gas diffusion layer and the separator which are conductors.

At the cathode, the hydrogen ions supplied through the electrolyte membrane and the electrons delivered through the separator meet oxygen in the air supplied to the cathode by an air supply device to create a reaction of producing water. Due to the movement of the hydrogen ions, the electrons flow through external conductive wires, and an electric current is produced due to the flow of the electrons.

The cooling line 100 is configured to pass through the power electronic parts 400 of the vehicle, and the coolant circulates along the cooling line 100.

In this case, the power electronic parts 400 of the vehicle may be understood as components that use power (e.g., power generated by the fuel cell stack) of the vehicle as an energy source, and the present disclosure is not restricted or limited by the type and the number of power electronic parts 400 of the vehicle.

For example, the power electronic parts 400 may include at least one of a bi-directional high-voltage DC-DC converter (BHDC) 410 provided between the fuel cell stack 30 and a high-voltage battery (not illustrated) of the vehicle, a blower pump control unit (BPCU) 420 configured to control a blower (not illustrated) configured to supply outside air for operating the fuel cell stack 30, an air compressor (ACP) 430 configured to compress air to be supplied to the fuel cell stack 30, an air cooler 440, and a low-voltage DC-DC converter (LDC) 450 configured to convert high direct-current voltage, which is supplied from the high-voltage battery, into low direct-current voltage.

The cooling unit 110 is provided in the cooling line 100 and cools the coolant circulating along the cooling line 100.

Various cooling means capable of cooling the coolant may be used as the cooling unit 110, and the present disclosure is not restricted or limited by the type and the structure of the cooling unit 110.

For example, the cooling unit 110 may include a radiator. Various radiators capable of cooling the coolant may be used as the radiator, and the present disclosure is not restricted or limited by the type and the structure of the radiator. According to another exemplary embodiment of the present disclosure, a water-cooled cooling means may be used as the cooling unit.

Further, a reservoir (not illustrated) configured to store the coolant may be connected to the cooling unit 110.

According to the exemplary embodiment of the present disclosure, the thermal management system 10 for a fuel cell vehicle may include a pump 130 provided in the cooling line 100, disposed between the outlet of the cooling unit 110 and the driving components 120, and configured to force the coolant to flow.

For reference, in the exemplary embodiment of the present disclosure, the inlet of the cooling unit 110 may be defined as an inlet through which the coolant is introduced into the cooling unit 110. In addition, the outlet of the cooling unit 110 may be defined as an outlet through which the coolant passing through the cooling unit 110 is discharged.

A typical pumping means capable of pumping the coolant may be used as the pump 130, but the present disclosure is not restricted or limited by the type and the properties of the pump 130.

The driving components 120 are provided in the cooling line 100 drive the vehicle.

In the exemplary embodiment of the present disclosure, the driving components 120 of the vehicle may be understood as components that drive the vehicle (i.e., components required to drive the vehicle), and the present disclosure is not restricted or limited by the type and the number of driving components 120.

For example, the driving components 120 may include a motor 122 configured to provide driving power required to drive the vehicle, and an inverter 124 configured to convert electric current to be applied to the motor 122.

The bypass line 200 is provided so that the coolant circulating along the cooling line 100 does not selectively pass through the driving components 120 (the coolant bypasses the driving components without passing through the driving components).

More specifically, based on whether the vehicle travels (e.g., whether the vehicle is in a traveling state or a stationary state), the bypass line 200 is provided so that the coolant does not pass through the driving components 120 (cool the driving components) (the coolant bypasses the driving components without passing through the driving components).

This is to shorten a circulation route of the coolant passing through the power electronic parts 400 when the vehicle is stationary and to concentrate the cooling effect of the coolant on the power electronic parts 400.

That is, in a case in which the coolant is supplied to the driving components (e.g., the motor), which are not required to be cooled, even when the vehicle is stationary, there is a problem in that a flow of the coolant decreases (a flow rate decreases due to a pressure loss). In addition, because the decrease in flow of the coolant causes a deterioration in cooling performance of the coolant, power consumption of a pump for circulating the coolant needs to be inevitably increased to ensure a sufficient flow of the coolant, and as a result, there is a deterioration in efficiency and performance in cooling the power electronic parts required to be cooled (i.e., the power electronic parts that generate high-temperature heat when the vehicle is stationary).

In contrast, according to the exemplary embodiment of the present disclosure, the coolant may pass through the driving components 120 or the coolant may bypass the driving components 120 along the bypass line 200 without passing through the driving components 120 based on the traveling state or the stationary state of the vehicle. As a result, it is possible to obtain an advantageous effect of ensuring a smooth flow of the coolant, minimizing consumption of power of the pump 130 for circulating the coolant, and efficiency in cooling the power electronic parts 400 required to be cooled (e.g., the power electronic parts that generate high-temperature heat when the vehicle is stationary).

This is based on the fact that the amount of heat generated by the driving components 120 is minimized (e.g., the amount of generated heat decreases to the extent that the cooling is not required) when the vehicle is stationary even though the driving components 120 generates heat while the vehicle travels. Since the coolant bypasses the driving components 120 along the bypass line 200 without passing through the driving components (the coolant circulates along the cooling line without passing through the driving components) when the vehicle is stationary, the circulation route of the coolant passing through the power electronic parts 400 may be shortened, and the cooling effect of the coolant may be concentrated on the power electronic parts 400. As a result, it is possible to obtain an advantageous effect of improving safety and reliability and improving efficiency of the coolant cooling the power electronic parts 400.

According to the exemplary embodiment of the present disclosure, the first end (e.g., a left end based on FIG. 1) of the bypass line 200 may be connected to the cooling line 100 at the first point positioned between the driving components 120 and the outlet of the cooling unit 110, and the second end (e.g., a right end based on FIG. 1) of the bypass line 200 may be connected to the cooling line 100 at the second point positioned between the driving components 120 and the inlet of the cooling unit 110.

In particular, the first end of the bypass line 200 may be connected to the cooling line 100 and disposed between the pump 130 and the driving components 120.

According to the exemplary embodiment of the present disclosure, the thermal management system 10 for a fuel cell vehicle may include a first valve 140 provided in the cooling line 100, positioned at the first point, and connected to the first end of the bypass line 200.

The first valve 140 is provided to selectively switch a flow path of the coolant to the driving components 120 (e.g., the motor) or the bypass line 200.

In particular, when the vehicle travels, the first valve 140 switches the flow path of the coolant to the driving components 120 so that the coolant passes through the driving components 120. In contrast, when the vehicle is stationary, the first valve 140 may switch the flow path of the coolant to the bypass line 200 so that the coolant bypasses the driving components 120.

Various valve means capable of selectively switching the flow path of the coolant to the driving components 120 or the bypass line 200 may be used as the first valve 140, and the present disclosure is not restricted or limited by the type and the structure of the first valve 140.

As an example, a typical three-way valve may be used as the first valve 140. More specifically, the first valve 140 includes a first-1 port 142 connected to the cooling line 100 so that the coolant pumped by the pump 130 is introduced, a first-2 port 144 connected to the cooling line 100 so that the coolant passing through the first valve 140 is introduced into the motor 122, and a first-3 port 146 to which the first end of the bypass line 200 is connected.

It is possible to selectively switch the flow path of the coolant to the driving components 120 or the bypass line 200 by opening or closing the first-2 port 144 and the first-3 port 146 of the first valve 140.

That is, when the first-2 port 144 is opened and the first-3 port 146 is closed, the coolant passing through the first valve 140 may be introduced into the driving components 120. On the contrary, when the first-3 port 146 is opened and the first-2 port 144 is closed, the coolant passing through the first valve 140 may be introduced into the cooling unit 110 through the bypass line 200 without passing through the driving components 120.

The connection structure between the bypass line 200 and the cooling line 100 may be variously changed depending on required conditions and design specifications.

According to the exemplary embodiment of the present disclosure, the cooling line 100 may include a first line 102 configured to connect the outlet of the cooling unit 110 and the pump 130, a second line 104 configured to connect the pump 130 and the driving components 120, a third line 106 connected in parallel to the second line 104 and configured to connect the driving components 120, and a fourth line 108 configured to connect the driving components 120 and the inlet of the cooling unit 110. The first end of the bypass line 200 may be connected to the second line 104, and the second end of the bypass line 200 may be connected to the fourth line 108.

Hereinafter, an example in which some of the power electronic parts 400 (e.g., the BHDC, the BPCU, the air compressor, and the air cooler) are provided in the third line 106 and the remaining power electronic parts 400 (e.g., the LDC) are provided in the second line 104 will be described.

In particular, the motor 122 may be provided in the second line 104, the inverter may be provided in the cooling line 100 (e.g., the second line) and disposed between the first point (the first valve 140) and the motor 122.

According to the exemplary embodiment of the present disclosure, the thermal management system 10 for a fuel cell vehicle may include a connection line 300 having an inlet end connected to the second line 104, and an outlet end connected to the bypass line 200.

The connection line 300 is provided so that the coolant circulating along the third line 106 does not selectively pass through the motor 122 (the coolant bypasses the motor along the bypass line without passing through the motor).

According to the exemplary embodiment of the present disclosure, one end (e.g., an upper end based on FIG. 1) of the connection line 300 may be connected to the third line 106 at a most downstream point (e.g., a downstream point from the air cooler) in the third line 106, and the other end (e.g., a lower end based on FIG. 1) of the connection line 300 may be connected to the bypass line 200.

According to the exemplary embodiment of the present disclosure, the thermal management system 10 for a fuel cell vehicle may include a second valve 150 provided in the second line 104 and connected to the inlet end of the connection line 300.

The second valve 150 is provided to switch the flow path of the coolant, which is supplied to the third line 106, to the motor 122 or the bypass line 200.

In particular, the second valve 150 may switch the flow path of the coolant to the motor 122 when the vehicle travels so that the coolant passes through the motor 122, and the second valve 150 may switch the flow path of the coolant to the bypass line 200 when the vehicle is stationary so that the coolant bypasses the motor 122.

Various valve means capable of selectively switching the flow path of the coolant to the driving components 120 (e.g., the motor) or the bypass line 200 may be used as the second valve 150, and the present disclosure is not restricted or limited by the type and the structure of the second valve 150.

As an example, a typical three-way valve may be used as the second valve 150. More specifically, the second valve 150 includes a second-1 port 152 connected to the third line 106 so that the coolant passing through the air cooler 440 is introduced, a second-2 port 154 connected to the third line 106 so that the coolant passing through the second valve 150 is introduced into the motor 122, and a second-3 port 156 to which one end of the connection line 300 is connected.

It is possible to selectively switch the flow path of the coolant to the motor 122 or the bypass line 200 by opening or closing the second-2 port 154 and the second-3 port 156 of the second valve 150.

That is, when the second-2 port 154 is opened and the second-3 port 156 is closed, the coolant passing through the second valve 150 may be introduced into the motor 122. On the contrary, when the second-3 port 156 is opened and the second-2 port 154 is closed, the coolant passing through the second valve 150 may be introduced into the cooling unit 110 along the bypass line 200 through the connection line 300 without passing through the motor 122.

Meanwhile, in the exemplary embodiment of the present disclosure described above and illustrated in the drawings, the example in which the second line 104 and the third line 106, which constitute the cooling line 100, are connected in parallel has been described. However, according to another exemplary embodiment of the present disclosure, the second line and the third line may be connected in series.

According to the exemplary embodiment of the present disclosure, the thermal management system 10 for a fuel cell vehicle may include an oil circulation line 500 provided in the vehicle and configured to allow oil to circulate therethrough, and a heat exchanger 600 configured to allow the coolant and the oil to exchange heat.

In the exemplary embodiment of the present disclosure described above, the coolant circulating along the cooling line 100 and the oil circulating along the oil circulation line 500 exchange heat by means of the heat exchanger 600, and as a result, it is possible to obtain an advantageous effect of improving performance in cooling the oil.

Above all, according to the exemplary embodiment of the present disclosure, since the coolant and the oil exchange heat, a temperature of the oil may be lowered without increasing a capacity of an oil cooling unit 520 (a cooling unit for cooling the oil circulating along the oil circulation line), and as a result, it is possible to obtain an advantageous effect of simplifying the structure and improving a degree of design freedom and spatial utilization.

In particular, according to the exemplary embodiment of the present disclosure, it is possible to additionally reduce a temperature of the oil even when a vehicle (e.g., a construction machine), which cannot use vehicle-induced wind, is stationary, and as a result, it is possible to obtain an advantageous effect of improving stability and reliability of components to which the oil is supplied.

The heat exchanger 600 may have various structures capable of allowing the coolant and the oil to exchange heat, and the present disclosure is not restricted or limited by the type and the structure of the heat exchanger 600.

In particular, the oil circulation line 500 and a heat exchange line 610 may be provided to flow (pass) through the heat exchanger 600.

More specifically, the thermal management system 10 for a fuel cell vehicle may include an oil pump 510 provided in the oil circulation line 500 and configured to force the oil to flow, and an oil cooling unit 520 provided in the oil circulation line 500 and configured to cool the oil.

A typical pumping means capable of pumping the oil may be used as the oil pump 510, and the present disclosure is not restricted or limited by the type and the properties of the oil pump 510.

Various cooling means capable of cooling the oil may be used as the oil cooling unit 520, and the present disclosure is not restricted or limited by the type and the structure of the oil cooling unit 520.

For example, the oil cooling unit 520 may include a radiator. Various radiators capable of cooling the oil may be used as the radiator, and the present disclosure is not restricted or limited by the type and the structure of the radiator. According to another exemplary embodiment of the present disclosure, a water-cooled cooling means may be used as the oil cooling unit.

In particular, the thermal management system 10 for a fuel cell vehicle may include the heat exchange line 610 connected to the cooling line 100 and provided between the outlet of the cooling unit 110 and the driving components 120, and the oil circulation line 500 and the heat exchange line 610 may be provided to pass through the heat exchanger 600.

As described above, since the heat exchanger 600 is provided in the heat exchange line 610 that branches off from the cooling line 100, the heat exchange between the oil and the coolant may be selectively performed based on whether the vehicle travels (e.g., whether the vehicle is in the traveling state or the stationary state).

More particularly, the thermal management system 10 for a fuel cell vehicle may include a third valve 620 provided in the cooling line 100 and connected to one end of the heat exchange line 610.

In order to selectively shut off the supply of the coolant to the heat exchange line 610, the third valve 620 may be provided to selectively switch the flow path of the coolant to the heat exchanger 600 or the pump 130 (to the route that does not pass through the heat exchanger).

Various valve means capable of selectively switching the flow path of the coolant to the pump 130 or the heat exchanger 600 may be used as the third valve 620, and the present disclosure is not restricted or limited by the type and the structure of the third valve 620.

For example, a typical three-way valve may be used as the third valve 620. More specifically, the third valve 620 includes a third-1 port 622 connected to the cooling line 100 so that the coolant passing through the cooling unit 110 is introduced, a third-2 port 624 connected to the cooling line 100 so that the coolant passing through the third valve 620 is introduced into the pump 130, and a third-3 port 626 to which one end of the heat exchange line 610 is connected.

It is possible to selectively switch the flow path of the coolant to the pump 130 or the heat exchanger 600 by opening or closing the third-2 port 624 and the third-3 port 626 of the third valve 620.

That is, when the third-2 port 624 is opened and the third-3 port 626 is closed, the coolant passing through the third valve 620 may be introduced directly into the pump 130 without passing through the heat exchanger 600. On the contrary, when the third-3 port 626 is opened and the third-2 port 624 is closed, the coolant passing through the third valve 620 may pass through the heat exchanger 600, and then may be introduced into the pump 130 along the cooling line 100.

In particular, the third valve 620 may selectively shut off the supply of the coolant to the heat exchange line 610 based on a temperature of the oil.

For example, when a temperature of the oil is lower than a predetermined reference temperature of the oil, the third valve 620 may switch the flow path of the cooling unit 110 to the pump 130 (may shut off the supply of the coolant to the heat exchange line) so that the coolant does not pass through the heat exchanger 600. In contrast, when a temperature of the oil is higher than the predetermined reference temperature of the oil, the third valve 620 may switch the flow path of the coolant to the heat exchanger 600 so that the coolant passes through the heat exchanger 600.

More particularly, the third valve 620 may selectively shut off the supply of the coolant to the heat exchange line 610 based on a temperature of the coolant (e.g., a temperature of the coolant that has passed through the cooling unit).

For example, a temperature of the coolant, which has passed through the cooling unit 110, is higher than a predetermined reference temperature of the coolant, the third valve 620 may switch the flow path of the cooling unit 110 to the pump 130 (may shut off the supply of the coolant to the heat exchange line) so that the coolant does not pass through the heat exchanger 600. In contrast, when a temperature of the coolant, which has passed through the cooling unit 110, is lower than the predetermined reference temperature of the coolant, the third valve 620 may switch the flow path of the coolant to the heat exchanger 600 so that the coolant passes through the heat exchanger 600.

As described above, in the exemplary embodiment of the present disclosure, the coolant is supplied to the heat exchange line 610 only when a temperature of the coolant is lower than the predetermined reference temperature of the coolant, and as a result, it is possible to obtain an advantageous effect of minimizing an influence of the heat exchange between the coolant and the oil (e.g., a deterioration in performance in cooling the power electronic parts and the driving components caused by an increase in temperature of the coolant).

Hereinafter, the flows of the coolant in accordance with whether the vehicle travels will be described.

Figure 2:
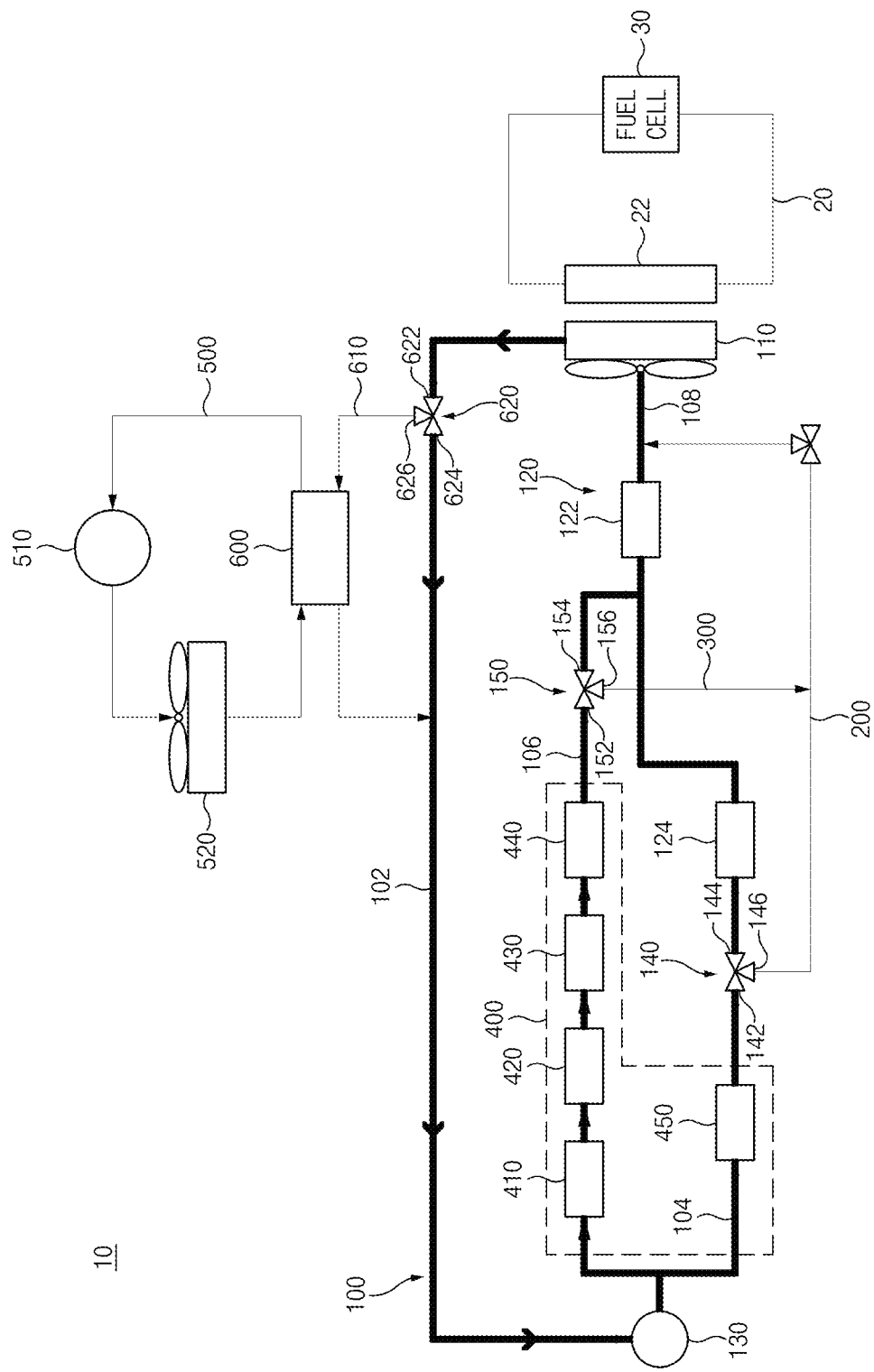
FIG. 2 is a view for explaining a flow of a coolant in the thermal management system for a fuel cell vehicle according to the exemplary embodiment of the present disclosure while a vehicle travels.

Referring to FIG. 2, when the vehicle travels, the coolant passing through the cooling unit 110 may cool all the power electronic parts 400 and the driving components 120 while flowing along the first line 102, the second line 104, the third line 106, and the fourth line 108.

Figure 3:
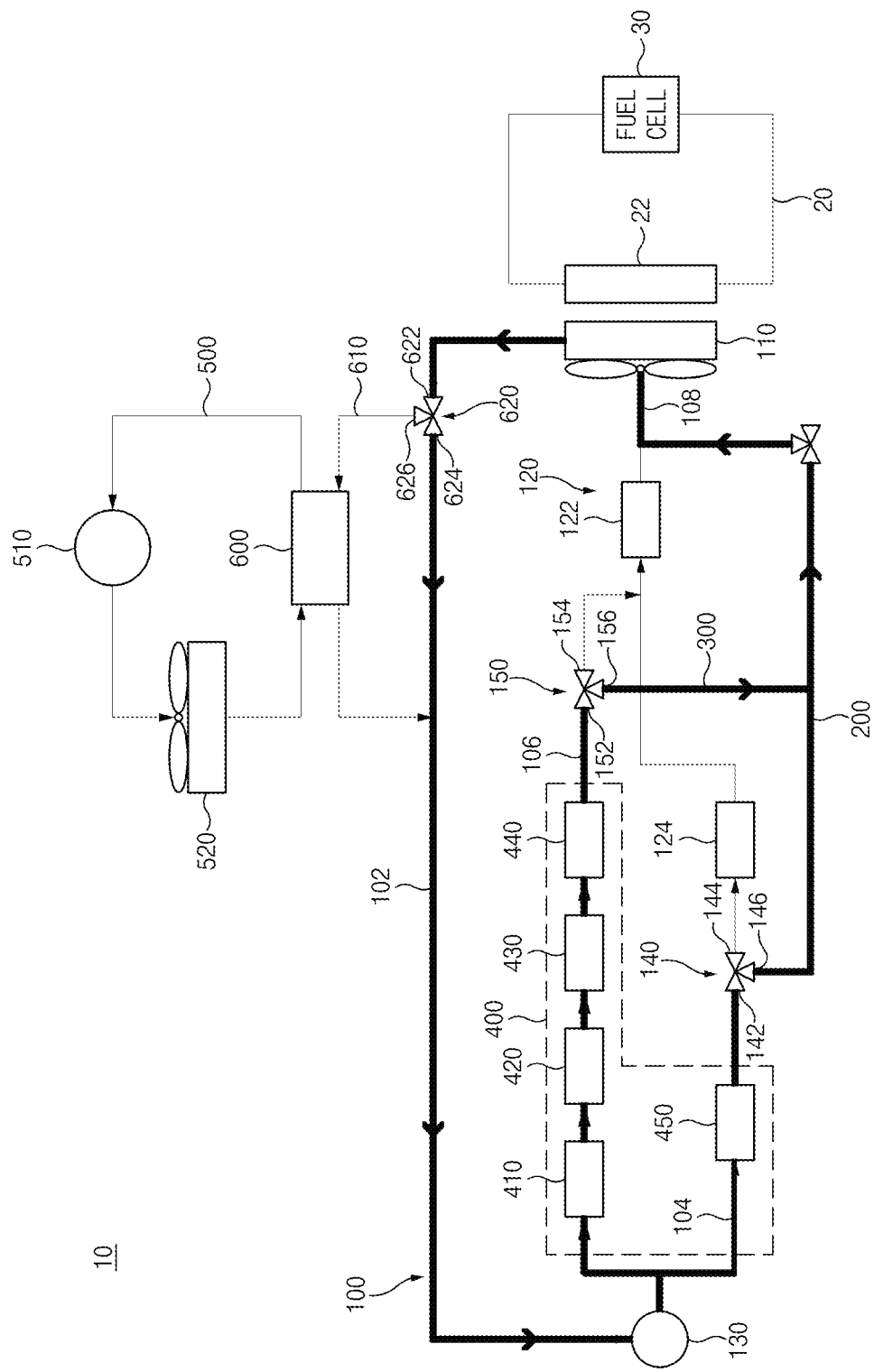
FIG. 3 is a view for explaining a flow of the coolant in the thermal management system for a fuel cell vehicle according to the exemplary embodiment of the present disclosure when the vehicle is stationary.

In contrast, referring to FIG. 3, when the vehicle is stationary, the first-3 port 146 of the first valve 140 is opened, and the first-2 port 144 is closed, such that the coolant passing through the first valve 140 may be introduced into the cooling unit 110 through the bypass line 200 without passing through the driving components 120. Therefore, the coolant may cool only the power electronic parts 400 without cooling the driving components 120.

Likewise, when the vehicle is stationary, the second-3 port 156 of the second valve 150 is opened, and the second-2 port 154 is closed, such that the coolant passing through the second valve 150 may be introduced directly into the cooling unit 110 along the bypass line 200 through the connection line 300 without passing through the motor 122. Therefore, the coolant may cool only the power electronic parts 400 without cooling the driving components 120.

Figure 4:
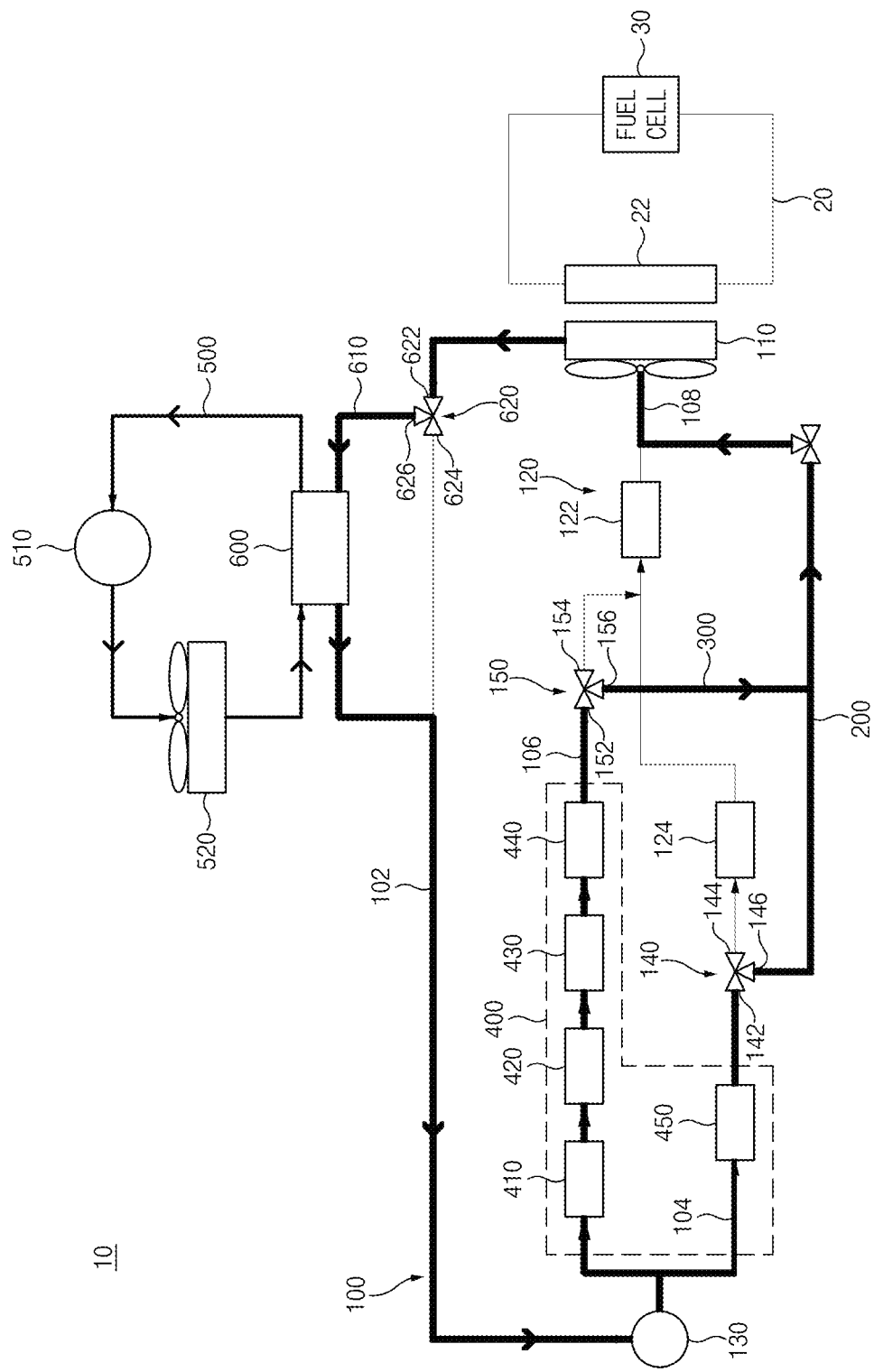
FIGS. 4 and 5 are views for explaining an oil circulation line in the thermal management system for a fuel cell vehicle according to the exemplary embodiment of the present disclosure.

Meanwhile, referring to FIG. 4, when the vehicle is stationary (or when the vehicle travels), the coolant circulates along the cooling line 100, and the oil circulating along the oil circulation line 500 may be cooled by the oil cooling unit 520.

For example, when a temperature of the oil is higher than the reference temperature of the oil (or when a temperature of the coolant is lower than the reference temperature of the coolant, the third-3 port 626 of the third valve 620 is opened, and the third-2 port 624 is closed, such that the coolant passing through the third valve 620 may pass through the heat exchanger 600 and then may be introduced into the pump 130 along the cooling line 100. Since the coolant passes through the heat exchanger 600 as described above, the coolant circulating along the cooling line 100 and the oil circulating along the oil circulation line 500 may exchange heat by means of the heat exchanger 600, such that the oil circulating along the oil circulation line 500 may be cooled by the oil cooling unit 520 and also be cooled by the heat exchange with the coolant.

Figure 5:
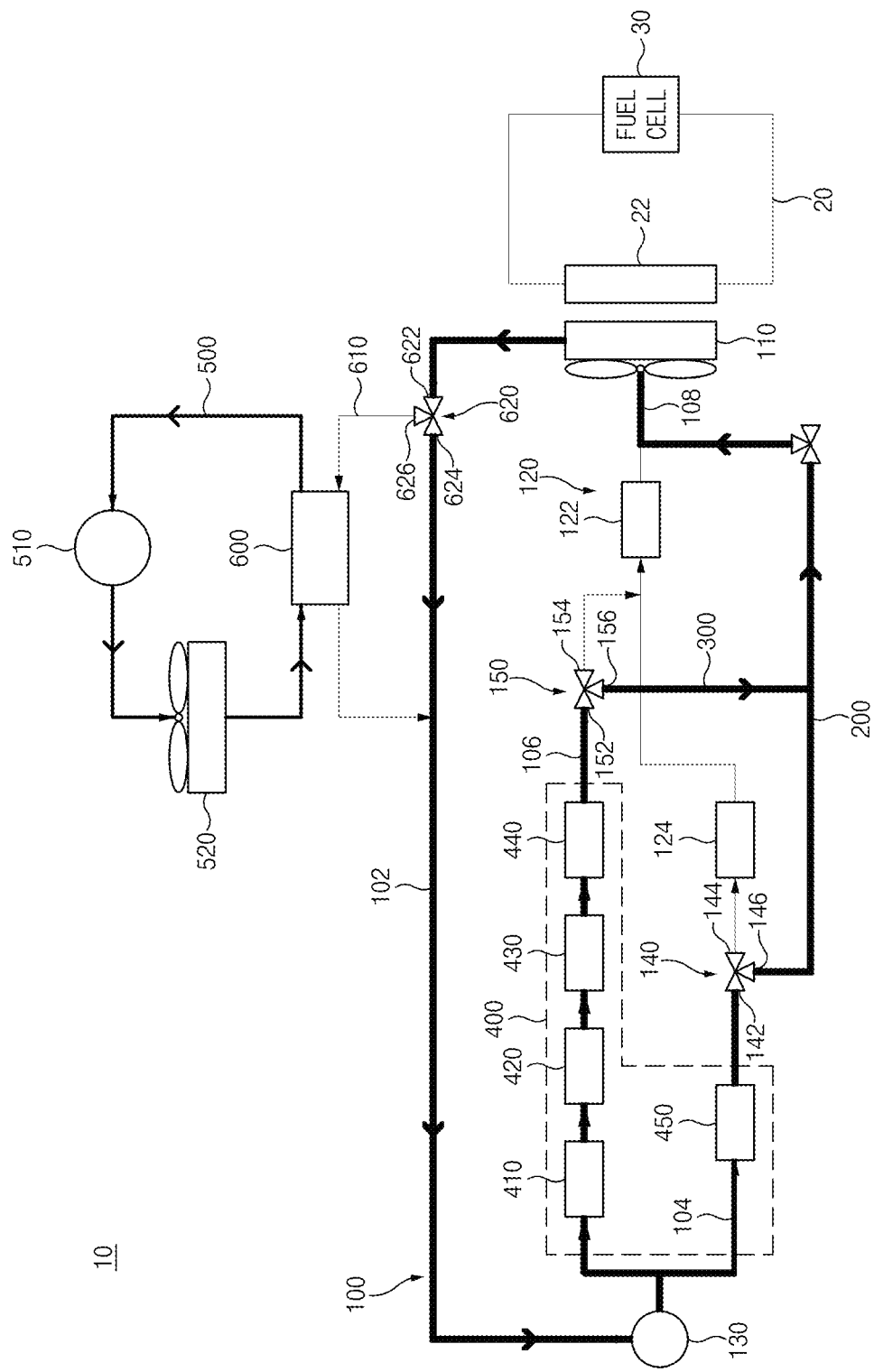

In contrast, as illustrated in FIG. 5, when a temperature of the oil is lower than the reference temperature of the oil (or when a temperature of the coolant is higher than the reference temperature of the coolant), the third-2 port 624 of the third valve 620 is opened, and the third-3 port 626 is closed, such that the coolant passing through the third valve 620 may be introduced directly into the pump 130 without passing through the heat exchanger 600. In this case, the oil circulating along the oil circulation line 500 may be cooled only by the oil cooling unit 520.

According to the present disclosure described above, it is possible to obtain an advantageous effect of improving cooling efficiency and cooling performance and improving safety and reliability.

In particular, according to the exemplary embodiment of the present disclosure, it is possible to shorten the circulation route of the coolant that passes through the power electronic parts when the vehicle is stationary, and it is possible to concentrate the cooling effect of the coolant on the power electronic parts. Therefore, it is possible to obtain an advantageous effect of more effectively cooling the power electronic parts that generates high-temperature heat when the vehicle is stationary, and thus improving operational performance and operational efficiency of the power electronic parts.

In addition, according to the exemplary embodiment of the present disclosure, it is possible to obtain an advantageous effect of ensuring a flow of the coolant and reducing power consumption.

In addition, according to the exemplary embodiment of the present disclosure, it is possible to obtain an advantageous effect of improving efficiency in cooling the oil circulating along the oil circulation line.

In addition, according to the exemplary embodiment of the present disclosure, it is possible to obtain an advantageous effect of simplifying the structure and improving a degree of design freedom and spatial utilization.

While the exemplary embodiments have been described above, but the exemplary embodiments are just illustrative and not intended to limit the present disclosure. It can be appreciated by those skilled in the art that various modifications and alterations, which are not described above, may be made to the present exemplary embodiment without departing from the intrinsic features of the present exemplary embodiment. For example, the respective constituent elements specifically described in the exemplary embodiments may be modified and then carried out. Further, it should be interpreted that the differences related to the modifications and alterations are included in the scope of the present disclosure defined by the appended claims.

What is claimed is:

1. A thermal management system for a fuel cell vehicle, the thermal management system comprising:
   a cooling line configured to pass through power electronic parts of a vehicle and allow a coolant to circulate therethrough;
   a cooling unit provided in the cooling line and configured to cool the coolant;
   driving components provided in the cooling line and configured to drive the vehicle;
   a bypass line having a first end connected to the cooling line at a first point positioned between the driving components and an outlet of the cooling unit, and a second end connected to the cooling line at a second point positioned between the driving components and an inlet of the cooling unit; and
   a connection line connected between the bypass line and the cooling line.

2. The thermal management system of claim 1, comprising:
   a first valve provided in the cooling line, positioned at the first point, and connected to the first end of the bypass line,
   wherein the first valve switches a flow path of the coolant to the driving components or the bypass line.

3. The thermal management system of claim 2, wherein the first valve switches the flow path of the coolant to the driving components when the vehicle travels, and
   wherein the first valve switches the flow path of the coolant to the bypass line when the vehicle is stationary.

4. The thermal management system of claim 1, comprising:
   a pump provided in the cooling line, disposed between the outlet of the cooling unit and the driving components, and configured to force the coolant to flow,
   wherein the first end of the bypass line is connected to the cooling line and disposed between the pump and the driving components.

5. The thermal management system of claim 4, wherein the cooling line comprises:
   a first line configured to connect the outlet of the cooling unit and the pump;
   a second line configured to connect the pump and the driving components;
   a third line connected in parallel to the second line and configured to connect the pump and the driving components; and
   a fourth line configured to connect the driving components and the inlet of the cooling unit, and wherein the first end of the bypass line is connected to the second line, and the second end of the bypass line is connected to the fourth line.

6. The thermal management system of claim 5, wherein the connection line having an inlet end connected to the third line, and an outlet end connected to the bypass line.

7. The thermal management system of claim 6, comprising:
   a second valve provided in the third line and connected to the inlet end of the connection line,
   wherein the second valve switches the flow path of the coolant to the driving components or the bypass line.

8. The thermal management system of claim 1, wherein the driving components comprise a motor configured to provide driving power required to drive the vehicle.

9. The thermal management system of claim 8, wherein the driving components comprise an inverter provided in the cooling line, disposed between the first point and the motor of the driving components, and configured to convert electric current to be applied to the motor.

10. The thermal management system of claim 1, wherein the power electronic parts comprise at least one of a bi-directional high-voltage DC-DC converter (BHDC) provided between a fuel cell stack of the vehicle and a high-voltage battery of the vehicle, a blower pump control unit (BPCU) configured to control a blower configured to supply outside air for operating the fuel cell stack, an air compressor (ACP) configured to compress air to be supplied to the fuel cell stack, an air cooler, and a low-voltage DC-DC converter (LDC) configured to convert high direct-current voltage, which is supplied from the high-voltage battery, into low direct-current voltage.

11. The thermal management system of claim 1, comprising:
    an oil circulation line provided in the vehicle and configured to allow oil to circulate therethrough; and
    a heat exchanger configured to allow the coolant and the oil to exchange heat.

12. The thermal management system of claim 11, comprising:
    a heat exchange line connected to the cooling line and disposed between the outlet of the cooling unit and the driving components,
    wherein the oil circulation line and the heat exchange line are provided to pass through the heat exchanger.

13. The thermal management system of claim 12, comprising:
    a third valve provided in the cooling line and connected to one end of the heat exchange line,
    wherein the third valve selectively shuts off a supply of the coolant to the heat exchange line.

14. The thermal management system of claim 13, wherein the third valve selectively shuts off the supply of the coolant to the heat exchange line based on a temperature of the oil.

15. The thermal management system of claim 13, wherein the third valve selectively shuts off the supply of the coolant to the heat exchange line based on a temperature of the coolant.

16. The thermal management system of claim 11, comprising:
    an oil pump provided in the oil circulation line and configured to force the oil to flow; and
    an oil cooling unit provided in the oil circulation line and configured to cool the oil.

* * * * *